(12) United States Patent
Liu et al.

(10) Patent No.: US 11,323,501 B2
(45) Date of Patent: May 3, 2022

(54) REMOTE MANAGEMENT

(71) Applicant: DTEN, Inc., San Jose, CA (US)

(72) Inventors: Wei Liu, San Jose, CA (US); Jin Guo, San Jose, CA (US); Sally Tung, San Jose, CA (US); Rui Xu, San Jose, CA (US)

(73) Assignee: DTEN, INC., San Jose, CA (US)

( * ) Notice: Subject to any disclaimer, the term of this patent is extended or adjusted under 35 U.S.C. 154(b) by 18 days.

(21) Appl. No.: 17/001,970

(22) Filed: Aug. 25, 2020

(65) Prior Publication Data
US 2021/0243244 A1    Aug. 5, 2021

Related U.S. Application Data

(60) Provisional application No. 62/968,776, filed on Jan. 31, 2020.

(51) Int. Cl.

| | |
|---|---|
| *H04L 29/06* | (2006.01) |
| *H04W 4/06* | (2009.01) |
| *H04W 48/16* | (2009.01) |
| *G06F 3/14* | (2006.01) |
| *H04M 3/56* | (2006.01) |
| *H04W 12/06* | (2021.01) |
| *H04W 12/041* | (2021.01) |
| *H04L 65/80* | (2022.01) |
| *H04L 65/403* | (2022.01) |

(52) U.S. Cl.
CPC ........... *H04L 65/80* (2013.01); *G06F 3/1454* (2013.01); *H04L 65/403* (2013.01); *H04M 3/568* (2013.01); *H04W 4/06* (2013.01); *H04W 12/041* (2021.01); *H04W 12/06* (2013.01); *H04W 48/16* (2013.01); *H04M 2201/40* (2013.01)

(58) Field of Classification Search
USPC ........................................................ 709/204
See application file for complete search history.

(56) References Cited

U.S. PATENT DOCUMENTS

| | | | | |
|---|---|---|---|---|
| 2008/0270555 | A1* | 10/2008 | Reynolds | G06F 3/165 709/206 |
| 2013/0275515 | A1* | 10/2013 | Lang | H04L 65/403 709/205 |
| 2015/0154291 | A1* | 6/2015 | Shepherd | G06F 16/95 707/748 |
| 2018/0063207 | A1* | 3/2018 | Liu | H04L 63/02 |

* cited by examiner

*Primary Examiner* — Hermon Asres
(74) *Attorney, Agent, or Firm* — Lempia Summerfield Katz LLC

(57) ABSTRACT

A system enables collaboration through electronic devices executes software or an operating system feature that allows a first device's computing environment to run remotely on a second devices computing software by scanning predetermined wireless channels to detect remote clients via a communication controller. The system transmits device profiles that include protocol versions that multiple clients support. The system generates a link layer that joins a first device to a second device and generates authenticating keys that establish a communication channel. The system enables operating modes of the first and second devices that establish the content and control of those devices.

21 Claims, 4 Drawing Sheets

REMOTE MANAGEMENT

PRIORITY CLAIM

This application claims the benefit of priority from U.S. Provisional Application No. 62/968,776 filed Jan. 31, 2020, which is herein incorporated by reference.

BACKGROUND OF THE DISCLOSURE

Technical Field

This application relates to remote device management

Related Art

Remote access allows users to access one device from another. The software allows computing environments to be run remotely without having to transport the serving environment to remote locations.

Some systems allow users to access a remote device by establishing a connection through a host. The host generally performs protocol conversions, messaging, encryption and routing that connects the controlling device to the controlled device. The host may comprise a dedicated server or multiple software applications running on a shared server. Such systems are subject to delays as they require intermediaries and surrogates to manage information and command flow.

DETAILED DESCRIPTION

Figure 1:
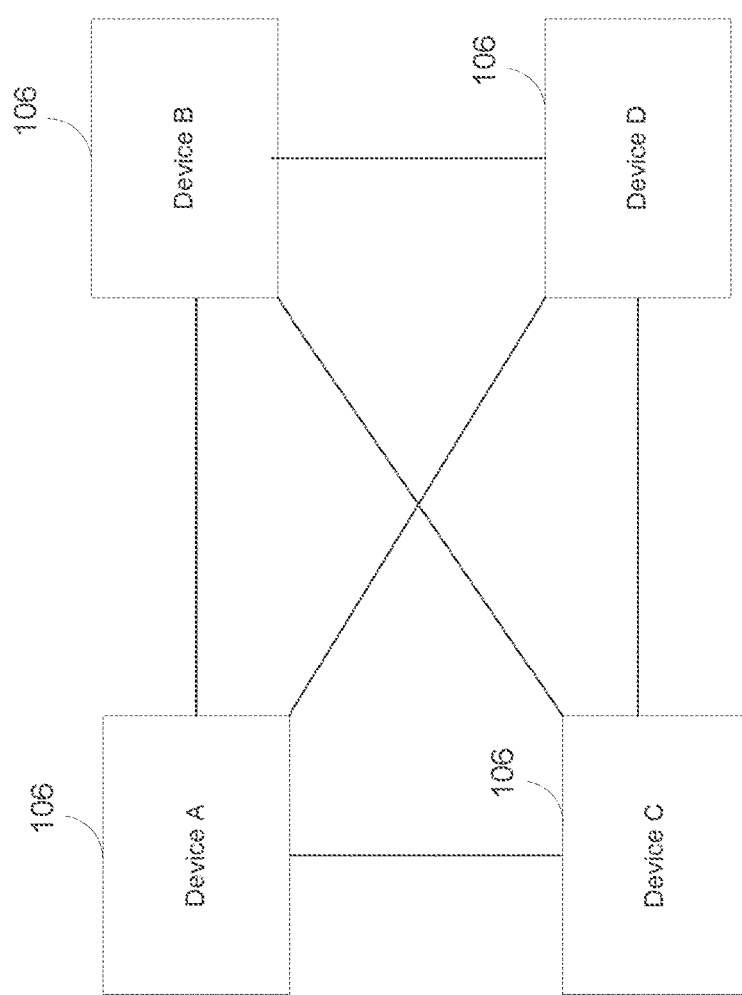
FIG. 1 shows a shared device connection.

Turn-key remote management systems and process (referred to as systems and/or devices interchangeably) provide users access to any system from any device or remote location. The remote management systems allow remote devices to connect and interact automatically without requiring any manual router or port changes. The systems provide a natural and an easy-to use remote experience, which in some systems, does not require the user to download software. The systems support audio controls and file transfers, encrypted connections, and execute remote commands. The software is resident to each of the devices via their applications and/or operating systems and is automatically updated.

Once the devices are paired and sharing is initiated, individual users can share audio, set audio levels, share windowed content, and/or portions of screens with other users and execute commands on select or all of the remote systems. The systems also enable multiple users to view the same screen simultaneously and control and share content delivered by the systems described in U.S. Pat. No. 62/900,232, titled Gesture Control Systems, filed on Sep. 19, 2019, that is incorporated herein by reference.

Some systems provide three operating modes of remote access: a meeting mode, a controller mode, and a local share mode that control other devices such as local and remote teleconferencing devices. In a meeting mode, independent and multiple devices or parties share the same screen and content simultaneously. The systems translate and convert the content and commands from the source devices to the capabilities and form factors of the receiving or client devices simultaneously and in parallel. The form factor may comprise any aspect of the hardware which defines and prescribes the size, shape, and other specifications of the display or whiteboard and capabilities of the device, or a broad class of components and/or it may prescribe compliance with one or more standards that the devices are compliant with.

Some controller mode allow content and control to flow from device A to device B exclusively, or from a single device to a subset or all of the devices, for example. In this controller mode, a device controls the data and content that is transferred to and rendered on the receiving devices. The controlling device also controls the operations of the other devices exclusively in what is referred to as a sharing flow. While data and information can enter and leave the receiving devices, the controlling device controls the data to be shared, controls dhow and to whom it is shared, and the manner that it can be controlled. In a back sharing flow, content delivery and device control are mutually exclusive. In this control mode, one or more devices control the sharing of data and the other one or more devices control the functions of the systems. In a collaboration control mode, each of the devices may control the other devices and share data and execute commands that can be manipulated in any manner with the receiving device. In a collaboration control mode, the systems imitate the way users generally collaborate and communicate with one another by providing content and sharing and control delegations to the user or device leading the collaboration at a given point in the interactive collaborative session. In an interactive collaborative session any of the users and their corresponding devices can more or less continuously intervene and control the activities of the other users and their devices.

In a local share mode, a coordinator node/worker nodes arrangement is followed. In this mode, one or more of the devices are the coordinator nodes that control the operation and content of the other devices called the worker nodes. The coordinator nodes control the operation of the other devices and content that flows to them.

FIG. 1 is a block diagram illustrating the architecture that enables some of the functionality of the remote management system. As shown, a cloud management technology allows multiple devices to communicate and perform collaboration via the modes described herein. Participating users through their devices collaborate through content sharing, whiteboarding, session control, etc. Commands issuing from any of the participating devices may be executed the same as local command issued by and followed by the remaining participating devices. Cloud management technology refers to applications, services or resources made available to users or devices on demand via the Internet.

The systems' architecture allows one device to manage input and execute commands locally that are also executed remotely by the devices, such as via devices A-D shown in FIG. 1. The content and commands may be delivered via a tangible or wireless medium. For example, when one device becomes a coordinator node, the control and communication flows in parallel to all of the other worker nodes. Through the use of a parallel processing architecture, some coordinator nodes interface adaptive controllers that deliver real-time or faster than real-time encoding and multiple adaptive bit rate outputs, that deliver multiple resolution, and deliver output formats and management features in real-time or near real-time simultaneously to the worker nodes that are compliant with variety of devices applications and operating platforms. A real-time operation comprises an operation matching a human's perception of time or a virtual process that enables data to be processed at the same rate (or perceived to be at the same rate) as the data is received or faster than it is received. In some applications it matches the rate of a physical or an external process. A management feature may control software, content, and signals for example. It may include signal sharing, audio sharing, screen sharing (e.g., including multiple whiteboard), etc.

Figure 2:
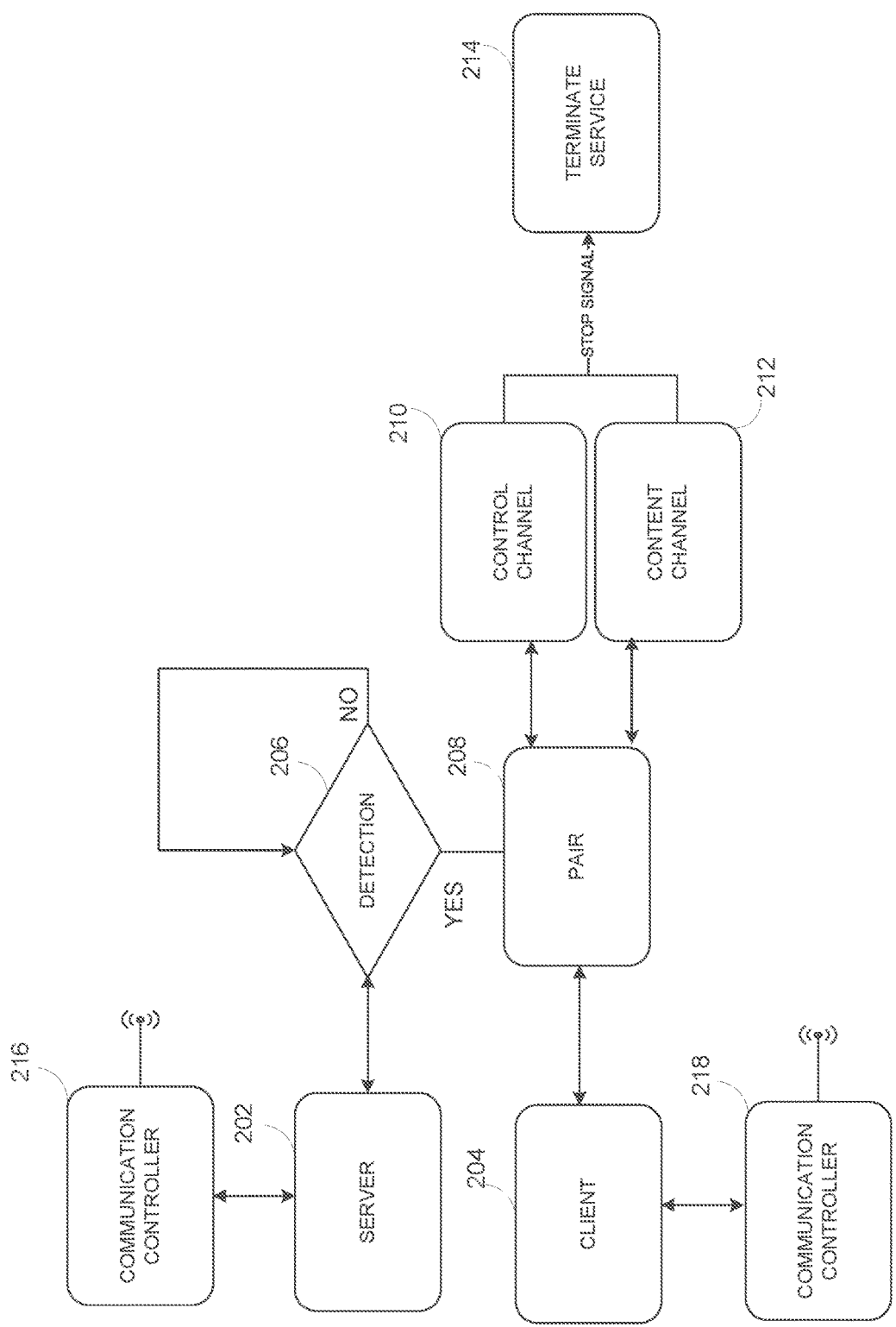
FIG. 2 is a system pairing.

To connect devices, the severs and clients enter a discoverable mode. In FIG. 2, servers 202 scans predetermined channels such as wireless channels to detect the presence of remote clients via communication controllers 216 and 218. When discovered, the discoverable client may share or transmit device profiles that include the connections and/or protocol versions the client supports and what connection the server and clients use to render a link layer connection at 206 to the server. A protocol is a series of communication steps that establish a communication channel. A "series of steps" means that the protocol follows a sequence, from start to finish involving two or more devices. Every step must be executed in turn, and no step can be taken before the previous step is finished. "Involving two or more devices" means that at least two devices are required to complete the protocol; one device alone does not make a protocol. A device alone can perform a series of steps.

With the connection established, the systems determine the key exchange and key generation (e.g., generate keys, that in some alternate systems, are automatically generated by random-bit strings) that are then stored in a key-space and used to encrypt each individual transmission. The encryption may occur by separate cipher keys via asymmetric algorithms (e.g., the key used for encryption is different from the key used for decryption), symmetric algorithms (e.g., encryption key can be calculated from the decryption key and vice versa) or other schemes. When session keys are used, they are useful for only one particular conversation or video conferencing session. The key exchange and/or use of session keys ensure confidentiality, integrity (e.g., ensure message was not modified in transit), and nonrepudiation (e.g., ensure that the sender cannot deny a message was sent).

Some systems may execute a key authentication to prevent ciphertext attacks that imitates the server and/or client when the devices are communicating with one another. When authentication is successful, control channels and data communication channels are generated and the device paring occurs at 208-212. When connections are completed, the server may issue a discover command through one or more control channels, in which the client devices respond with information that includes the client's functionalities and/or capabilities. In an exemplary pairing, a control channel may also be used report back to the server or transmitting device when a command is recognized, such as for example, whenever the system recognizes a gesture change that is linked to a client/server command when a gesture recognition is executed. The system (the client, in FIG. 2) may invoke a callback and/or execute the command when a gesture change or new command is recognized at the client. The content channel allows devices to share content and screens. When the session terminates, a stop signal is generated, which ends the service and communication exchange at 214.

Figure 3:
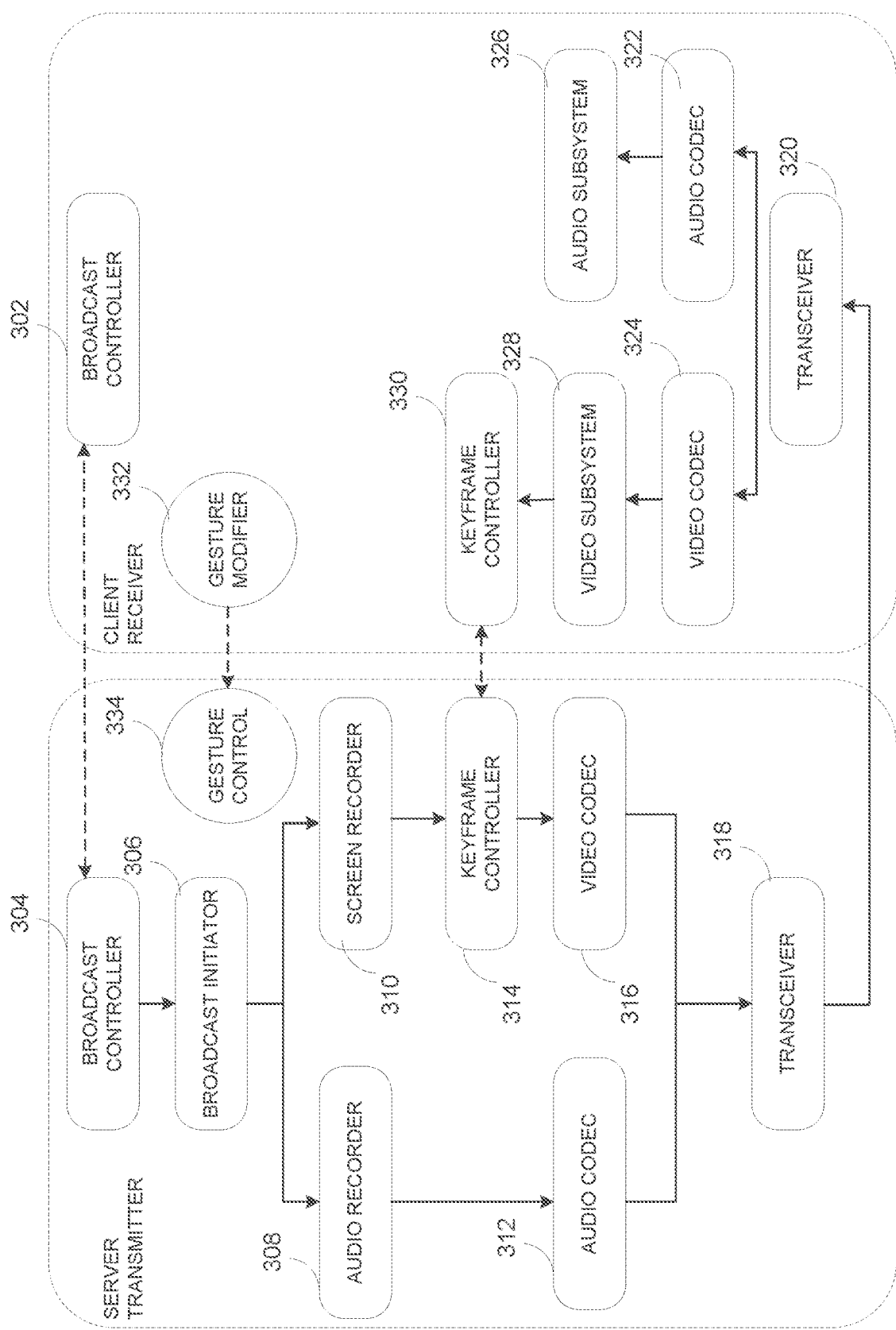
FIG. 3 shows distributed media processing logic.

FIG. 3 shows distributed media processing logic that facilitates the remote access modes, content sharing, and audio sharing. In FIG. 3, remote management is initiated via a broadcast controller 302. The broadcast controller 302 can initiate multicasting in one of three operating modes, a meeting mode, a controller mode, and a local share mode as described herein and request and initiate a broadcast. In FIG. 3, for example, the broadcast controller 302 at the client receiver (referred to as the client) may initiate a session with the server transmitter (referred to as the server) by requesting a broadcast from the broadcast controller 304 that is resident to the server via a pull request. In alternate systems broadcasts are also pushed. The request initiates a broadcast via a second broadcast controller 304 (this one resident to the server) and an initiator module 306 that enables the detection and recording of audio and video 308 and 310.

In FIG. 3, the audio recorder 308 may include a voice activity detection, that detects the presence of desired audio such as the presence of speech. Depending on the presence or absence of speech, a variable bit coding is executed in some alternative systems, which reduces the coding rate for a desired signal, such as a teleconference speech, in which a constant rate encoding is used. In such systems, a substantially constant encoding rate is applied in the audio codec 312 when active speech is detected, and a low encoding rate (e.g., between about a ten or fifty percent encoding rate, by a factor of two, or executing no encoding where the encoding operates via an on-off method) is applied when background noise is detected. The accuracy and robustness of the desired output in these alternative systems, determine the quality and capacity of the disclosed encoding. If no or substantially little desired signals are detected in the processed signal interval the encoding rate and capacity is reduced. If a desired signal is detected, the coding rate is increased. During intervals of heavy desired signal activity, reduced encoding rates are used for each active signals, allowing all active/desired signals to be transmitted. By reducing the coding rates based on active/desired signal levels or activity, the quality losses incurred by the lower encoding rates are offset by the avoidance of the loss of active speech or desired signal frames.

The executed features of a voice activity detector depends on the application for which it is used. An exemplary system that detects a desired signal may process the noise spectrum by estimating the noise spectrum to establish a threshold energy level and by inverse filtering input fames via a noise-whitening filter that processes audio segments during non-desired signal intervals. The energy of the resulting filtered output are compared to estimated thresholds that were derived when desired signals were present. If the output exceeds the threshold, the desired signal is detected and the alternative encoding rate is increased or maintained at high level to reduce degradations in the recovered desired signal quality.

In FIG. 3, the server responds to requests from clients (via keyframe controller 330) to identify the starting and stopping points of captured and rendered images such as video image via a keyframe controller 314 on or at the server. The video and audio codec 312 and 316 compress the audio and video signals to a predetermined standard audio and video compression specification, respectively. In some applications, the compressions is lossy to preserve bandwidth. Once the signals are compressed, the compression streams are transmitted by the server transceiver 318 and received by the client transceiver 320.

When the audio signals are decompressed at the audio codec 322, it is desirable to reproduce background noise to preserve the naturalness of the recovered signal for the listeners. When the background noise is stationary, some alternative system process the general characteristics of the noise to inject an artificial comfort noise during the absence of the desired signal. Because background noise is often nonstationary and its amplitude vary, some system code the background noise at a low bit rate (e.g., below a rate used to capture conversational speech) in the server and decode the background noise and other essential non-desired signal data to preserve the integrity of the signal and natural perception of the reproduced signal. With the desired signal and other signals decompressed and/or injected or added, it is pushed to the audio system 326 that renders the audio in the client. Similarly, a video codec 324 resident to the client receiver reconstructs the video by decompressing and parsing it and thereafter pushing it to a video player 328 that renders it. The rendering may be based on keyframe information.

When a touch event occurs in FIG. 3, a gesture modifier 332 recognizes the gesture event, and reports the gesture event to the server via a callback when a gesture state changes. In some systems, the callback updates the server on the gesture recognized and conveys the gesture attributes, such as during a prolonged press, where the gesture began and ended, and the elapsed time between the movements. In FIG. 3, touch events are passed independently from audio and video data.

Figure 4:
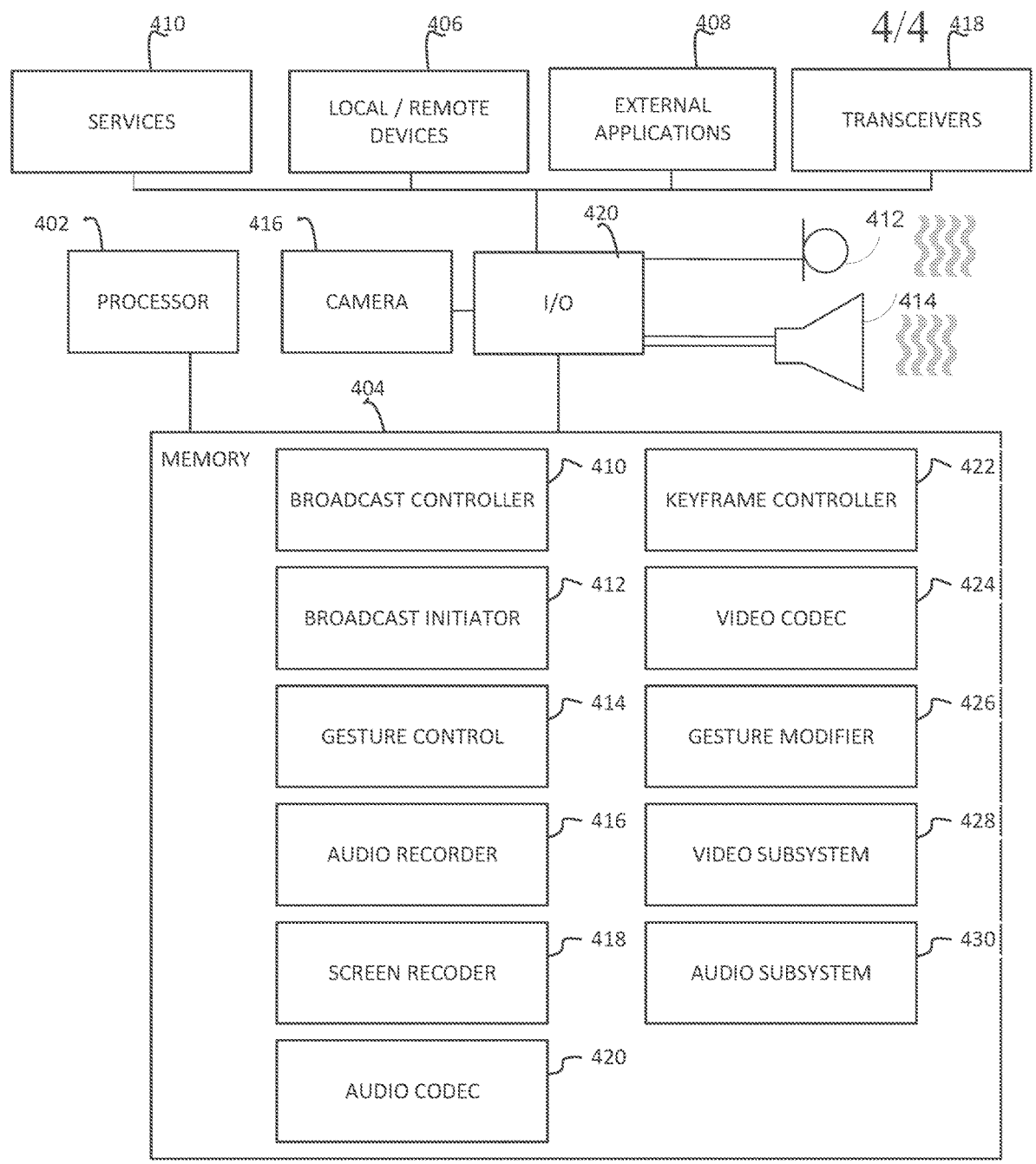
FIG. 4 shows alternative media processing logic.

FIG. 4 is a block diagram of systems that may execute the process flows, functions, and systems described above and those shown in FIGS. 1-3. The system comprises a processor (e.g., such as a host processor, for example, that comprises a central processor in hierarchical distributed processing systems), or graphical processor 402, a non-transitory media such as a memory 404 (the contents of which are accessible by one or more processors and/or graphical processors 402), a network, local/and remote devices 406, external applications 408, external services 410, a microphone or microphone array 412, one or more loudspeakers 414, audio amplifiers (not shown), audio interfaces (not shown), one or more cameras 416, transceivers 418 and an I/O subsystem 420. The I/O sub system 420 connects devices and local and/or replicated remote software applications. The memory 404 stores instructions, which when executed by the processor 402, causes the system to render some or all of the functionality associated with device management. The memory 404 stores instructions, which when executed by the processor 402, causes the system to automatically render functionality and hardware that enables remote management that includes the operating modes, the system pairing, media processing, etc., via a broadcast controller 410, broadcast initiator 412, gesture control 414, audio recorder 416, screen recorder 418, audio codec 420, keyframe controller 422, video codec 424, gesture modifier 426, video subsystem 428, and an audio subsystem 430. In yet another alternate system, the non-transitory media provided functionality is provided entirely or partially through cloud storage. The term cloud or cloud storage is intended to broadly encompass hardware and software that enables data to be maintained, managed, and backed up remotely and made available to users over a network. In this system, clouds and/or cloud storage provides ubiquitous access to the system's resources that can be rapidly provisioned over a private network. Clouds and/or cloud storage allows for the sharing of resources to achieve coherence services.

The memory 404 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 404 may comprise a single device or multiple devices that may be disposed on one or more dedicated memory devices or disposed on a processor or other similar device or disposed across remote devices. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" or "nearly" encompasses a range that is largely, but not necessarily wholly, what is specified. It encompasses all but an insignificant amount, such as the values disclosed and/or a variance within a range of five to ten percent of the given value or range. The term "remote location" and "remote" refers to a location that is apart from and geographically dispersed from another location.

Alternate systems are not limited to the particular hardware a described above. Other suitable hardware can be used. Furthermore, the systems are not limited to physically static systems. Rather, the systems can be used in mobile devices and operate across distributed networks. The systems illustratively disclosed herein may be practiced in the absence of any element (including hardware and/or software), which is not specifically disclosed herein. They may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of those elements).

A turn-key remote management system and process provide users access to any system from any device or remote location. The remote management system allows remote devices to connect and interact automatically. The system provides a natural and easy-to use collaborative experience, which in some systems, does not require the user to download software. The systems support audio controls and file transfers, encrypted connections, and execute remote commands. The software is resident to each of the devices and is automatically updated. Once the systems are paired and sharing is initiated, individual users can share audio, set audio levels, share windowed content, and/or portions of screens with other users and execute commands on select or all of the remote systems.

The subject-matter of the disclosure may also relate, among others, to the following aspects (the aspects are referenced by numbers):

1. A non-transitory computer implemented method of collaborating via an electronic device, comprising:
   executing software or an operating system feature that allows a first device's computing environment to run remotely on a second devices computing software by:
   scanning predetermined wireless channels to detect a plurality of remote clients via a communication controller;
   transmitting device profiles comprising protocol versions that the plurality of clients support;
   generating a link layer joining a first device to a second device;
   generating and authenticating keys that establish a communication channel; and enabling a plurality of operating modes of access to the first device and the second device that establishes a content rendered and a control of the first device and the second devices.

2. The non-transitory computer implemented method of aspect 1 where the plurality of operating modes comprise a meeting mode that enables an independent teleconferencing device and multiple teleconferencing devices or parties to share the same screen and content simultaneously delivered via a host processor.

3. The non-transitory computer implemented method of any of aspects 1 or 2 where the plurality of operating modes comprise a controller mode that enables an independent teleconferencing device to control the operation of multiple remote teleconferencing devices delivered via a host processor.

4. The non-transitory computer implemented method of any of aspects of 1 to 3 where the plurality of operating modes comprise a controller mode that enables an independent teleconferencing device to control the operation of multiple remote teleconferencing devices delivered via a host processor.

5. The non-transitory computer implemented method of any of aspects of 1 to 3 where the plurality of operating modes comprise a local share mode that enables an independent teleconferencing device to control the operation and the content delivered to multiple remote teleconferencing devices delivered via a host processor.

6. The non-transitory computer implemented method of aspect 5 where the local share mode communicates with the multiple remote teleconferencing devices in real time.

7. The non-transitory computer implemented method of aspect 6 further comprising executing a voice activity detection that executes a variable bit coding.

8. The non-transitory computer implemented method of aspect 7 where the variable bit coding is executed by a codec that applies a nearly constant encoding rate when a desired signal is detected.

9. The non-transitory computer implemented method of aspect 8 where the codec applies a substantially lower encoding rate than the nearly constant encoding rate when the desired signal is not detected.

10. The non-transitory computer implemented method of aspect 9 where the codec applies a lower encoding rate than the nearly constant encoding rate when a plurality of desired signals are detected.

11. A method of collaborating via an electronic device, comprising:
executing software or an operating system feature that allows a first device's computing environment to run remotely on a second devices computing software by:
scanning predetermined wireless channels to detect a plurality of remote clients via a communication controller;
transmitting device profiles comprising protocol versions that the plurality of clients support;
generating a link layer joining a first device to a second device;
generating and authenticating keys that establish a communication channel; and
enabling a plurality of operating modes of access to the first device and the second device that establishes a content delivered and a control of the first device and the second device.

12. The method of aspect 11 where the plurality of operating modes comprise a meeting mode that enables an independent teleconferencing device and multiple teleconferencing devices or parties share the same screen and content simultaneously delivered via a host processor.

13. The method of any of aspects of 11 or 12 where the plurality of operating modes comprise a controller mode that enables an independent teleconferencing device to control the operation of multiple remote teleconferencing devices delivered via a host processor.

14. The method of any of aspects of 11 or 13 where the plurality of operating modes comprise a controller mode that enables an independent teleconferencing device to control the operation of multiple remote teleconferencing devices delivered via a host processor.

15. The method of any of aspects of 11 or 13 where the plurality of operating modes comprise a local share mode that enables an independent teleconferencing device to control the operation and the content delivered to multiple remote teleconferencing devices delivered via a host processor.

16. The method of aspect 15 where the local share mode communicates with the multiple remote teleconferencing devices in real time.

17. The method of aspect 16 further comprising executing a voice activity detection that executes a variable bit coding.

18. The method of aspect 17 where the variable bit coding is executed by a codec that applies a nearly constant encoding rate when a desired signal is detected.

19. The method of aspect 18 where the codec applies a substantially lower encoding rate than the nearly constant encoding rate when the desired signal is not detected.

20. The method of aspect 19 where the codec applies a lower encoding rate reduced by a factor of two than the nearly constant encoding rate when a plurality of desired signals are detected.

21. The method of aspect 19 where the codec comprises an audio codec and a video codec.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

We claim:

1. A non-transitory computer implemented method of collaborating via an electronic device, comprising:
executing software or an operating system feature that allows a first device's computing environment to run remotely on a second devices computing software by:
scanning predetermined wireless channels to detect a plurality of remote clients via a communication controller;
transmitting device profiles comprising protocol versions that the plurality of clients support;
generating a link layer joining a first device to a second device;
generating and authenticating keys that establish a communication channel;
executing a voice activity detection that controls a variable bit coding; and
enabling a plurality of operating modes of access to the first device and the second device that establishes a content rendered and a control of the first device and the second devices;
where the plurality of operating modes comprise:
a meeting mode that enables an independent teleconferencing device and multiple remote teleconferencing devices or parties to share a same screen and content simultaneously delivered via a processor;
a controller mode that enables the independent teleconferencing device to control the operation of the multiple remote teleconferencing devices delivered via the processor; and
a local share mode that enables the independent teleconferencing device to control the operation and the content delivered to the multiple remote teleconferencing devices via the processor in real time; and
where the second device is remote from the first device.

2. The non-transitory computer implemented method of claim 1 where the plurality of operating modes comprise a collaboration mode in which a plurality of the independent teleconferencing devices control the other independent teleconferencing devices in response to a control delegation.

3. The non-transitory computer implemented method of claim 1 where the voice activity detection controls the variable bit coding based on a detection of a background noise.

4. The non-transitory computer implemented method of claim 1 where the variable bit coding is executed by a codec that applies a nearly constant encoding rate when a desired signal is detected.

5. The non-transitory computer implemented method of claim 4 where the codec applies a substantially lower encoding rate than the nearly constant encoding rate when the desired signal is not detected.

6. The non-transitory computer implemented method of claim 5 where the codec applies a lower encoding rate than the nearly constant encoding rate when a plurality of desired signals are detected.

7. A method of collaborating via an electronic device, comprising:
executing software or an operating system feature that allows a first device's computing environment to run remotely on a second devices computing software by:
scanning predetermined wireless channels to detect a plurality of remote clients via a communication controller;
transmitting device profiles comprising protocol versions that the plurality of clients support;
generating a link layer joining a first device to a second device;
generating and authenticating keys that establish a communication channel;
executing a voice activity detection that controls a variable bit coding; and
enabling a plurality of operating modes of access to the first device and the second device that establishes a content delivered and a control of the first device and the second device;
where the plurality of operating modes comprise:
a meeting mode that enables an independent teleconferencing device and multiple remote teleconferencing devices or parties share the same screen and content simultaneously delivered via a processor;
a controller mode that enables the independent teleconferencing device to control the operation of the multiple remote teleconferencing devices delivered via the processor; and
a local share mode that enables the independent teleconferencing device to control the operation and the content delivered to the multiple remote teleconferencing devices delivered via the processor in real time.

8. The method of claim 7 where the plurality of operating modes comprise a collaboration mode in which a plurality of the independent teleconferencing devices control the other independent teleconferencing devices in response to a control delegation.

9. The method of claim 7 where the voice activity detection controls the variable bit coding based on a detection of a background noise.

10. The method of claim 7 where the variable bit coding is executed by a codec that applies a nearly constant encoding rate when a desired signal is detected.

11. The method of claim 10 where the codec applies a substantially lower encoding rate than the nearly constant encoding rate when the desired signal is not detected.

12. The method of claim 11 where the codec applies a lower encoding rate reduced by a factor of two than the nearly constant encoding rate when a plurality of desired signals are detected.

13. The method of claim 11 where the codec comprises an audio codec and a video codec.

14. The non-transitory computer implemented method of claim 1 where the voice activity detection controls the variable bit coding based on an active signal level.

15. The non-transitory computer implemented method of claim 1 where the voice activity detection controls the variable bit coding based on a desired signal level.

16. The non-transitory computer implemented method of claim 1 further comprising processing characteristics of a noise during an absence of a desired signal.

17. The non-transitory computer implemented method of claim 1 further comprising injecting a comfort noise into an audio signal during an absence of a desired signal.

18. The method of claim 7 where the voice activity detection controls the variable bit coding based on an active signal level.

19. The method of claim 7 where the voice activity detection controls the variable bit coding based on a desired signal level.

20. The method of claim 7 further comprising processing characteristics of a noise during an absence of a desired signal.

21. The method of claim 7 further comprising injecting a comfort noise into an audio signal during an absence of a desired signal.

* * * * *